United States Patent [19]
Takahashi

[11] 3,880,560
[45] Apr. 29, 1975

[54] MOLDING MACHINE FOR SYNTHETIC RESIN ARTICLE

[75] Inventor: Shigetoshi Takahashi, Nagoya, Japan

[73] Assignee: Takahashi Seiki Co., Ltd., Nogoya-shi, Japan

[22] Filed: May 31, 1974

[21] Appl. No.: 475,200

[30] Foreign Application Priority Data
June 9, 1973 Japan.............................. 48-68392

[52] U.S. Cl................. 425/130; 425/242; 425/250; 425/192
[51] Int. Cl............................. B29c 9/00; B29f 1/12
[58] Field of Search.......... 425/130, 190, 192, 242, 425/247, 248, 249, 250

[56] References Cited
UNITED STATES PATENTS
3,752,615  8/1973  Van Manen........................ 425/130

*Primary Examiner*—J. Howard Flint, Jr.
*Attorney, Agent, or Firm*—Pennie & Edmonds

[57] ABSTRACT

This invention relates to a molding machine for synthetic resin article, comprizing journals provided turnably and revolvably between upper and lower bearing boards, a central die plate whose both sides have been formed into mold fixing surfaces die plates which move forward and backward by mold tightening cylinders approachably to and releasably from each of said mold fixing surfaces of the central die plate, to guide rods mounted between the upper and lower positions of fixed boards provided on the base and said bearing boards and a suitable number of injection devices respectively onto the base at the positions outside the fixed boards in such a manner that the nozzles of said injection devices are capable of advancing and retreating to and from respective injection openings of the movable die plate.

3 Claims, 3 Drawing Figures

MOLDING MACHINE FOR SYNTHETIC RESIN ARTICLE

This invention relates to a synthetic resin molding machine to mass-produce synthetic resin molded articles in which members of different colors or members of different kinds have been combined in integrity.

Conventionally, in order to obtain a synthetic resin molded article such as lens for trafic indicator lamp or keys of typewriter, in which members of more than two colors have been joined in integrity, it has been usual method either to adhere to one base-colored molded member another member which has been molded in different color in advance, or to frame a plurality of members, each of which has been previously molded in different color. Such a method has required many troubles to produce the molded articles and there have been obtained only the molded articles which are easily damaged. It has been deemed difficult to mass-produce such kinds of synthetic resin molded articles suitably and inexpensively. In order to eliminate the above-mentioned conventional demerits it is considered to mold an article in integrity which is provided with a plural color of portions. With conventional synthetic resin molding machines, however, it is difficult to make sufficient mold tightening to carry out multicolor molding in view of the construction of mold tightening device in the molding machines and it is impossible to mass-produce multicolored molded articles of good quality with best yield.

The object of the present invention is to manufacture a synthetic resin molding machine which has been completed with the intention of carrying out multicolor molding quickly and easily.

The invention will be described below in more detail, in conjunction with the accompanying drawings, in which.

Figure 1:
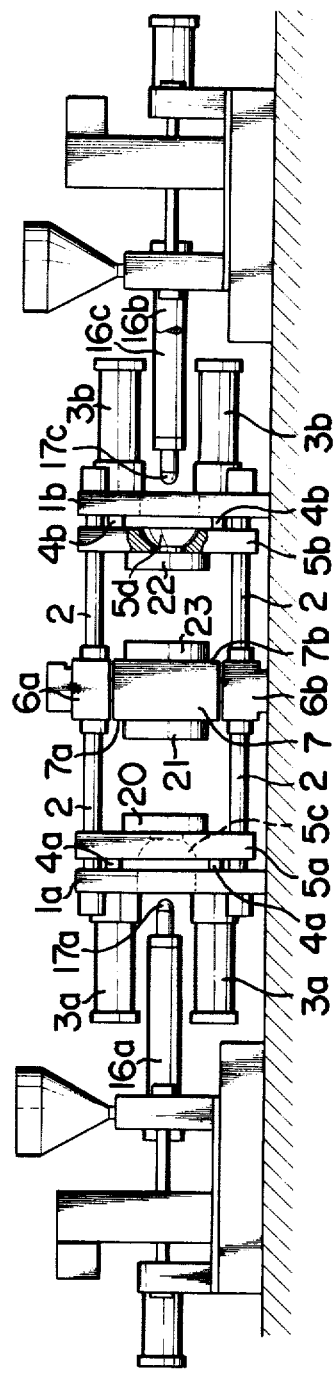
FIG. 1 is a partly broken elevation of a molding machine according to the present invention.
Figure 2:
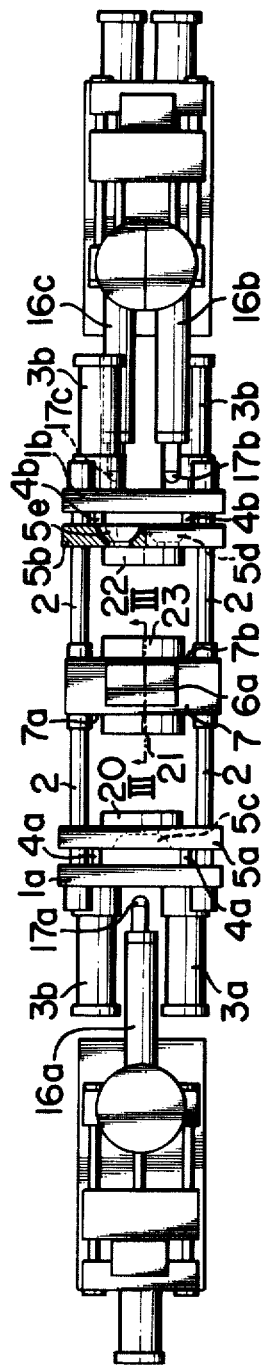
FIG. 2 is a partly broken top plan view of the same machine.
Figure 3:
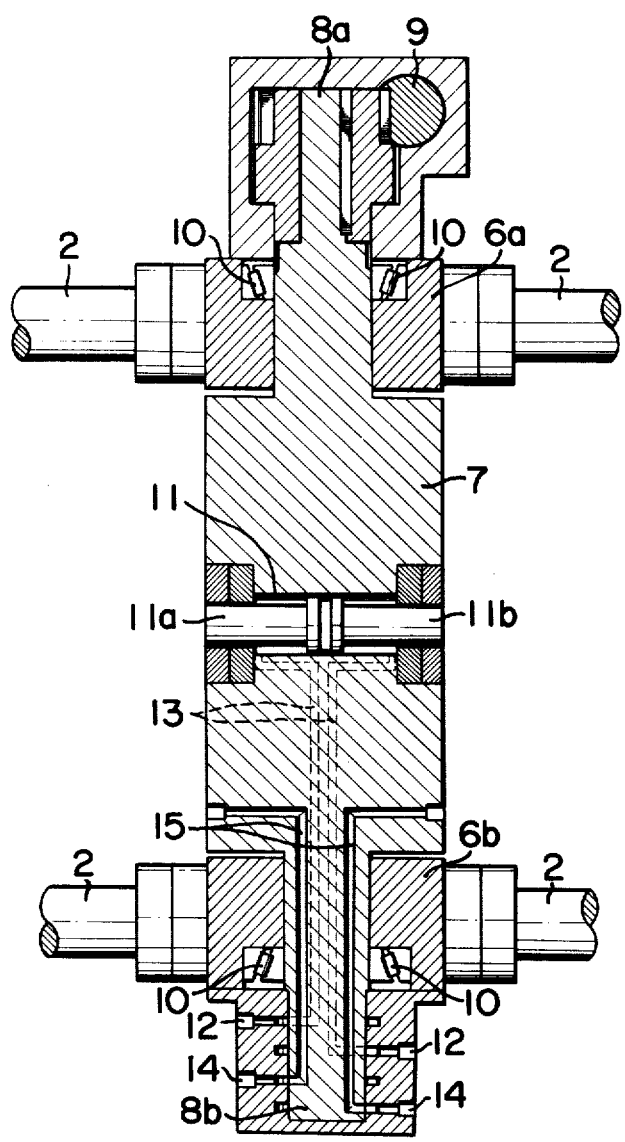
FIG. 3 is a section along the line III—III of FIG. 2.

Referring now FIGS. 1 throught 3, reference numerals 1a, 1b are left and right fixed boards provided oppositely at a regular space on the upper surface of the base, and between the four corners of said each fixed board 1a, 1b there are mounted four guide rods 2 at predetermined intervals. Numerals 3a, 3b represent mold tightening cylinders mounted oppositely to said fixed boards 1a, 1b, and the ends of pistons 4a, 4b of said mold tightening cylinders 3a, 3b are fixed to movable die plates 5a, 5b which are made to be guided by the guide rods 2, 2 passed through the four corners of the die plates, while with the back-wards and forwards movements of the pistons 4a, 4b said movable die plates 5a, 5b are able to advance and retreat. Reference numerals 6a, 6b show bearing boards which are respectively fixed to the upper guide rods 2 and the lower guide rods 2 in the middle positions of the movable die plates 5a and 5b. Between said bearing boards 6a, 6b there is journaled a central die plate 7 turnably with upper and lower shafts 8a, 8b, both the surfaces of said central die plate 7 being mold fixing portions. Reference 9 is a rack for rotation which is provided to the upper bearing board 6a to rotate said die plate 7 and actuated with a pressure cylinder, and references 10 are bearings provided at the supporting portions of the bearing boards 6a, 6b. Numeral 11 is a mold releasing cylinder which is provided at the center of the die plate 7 in such manner that pistons 11a, 11b face the mold fixing surfaces 7a, 7b and the cylinder carried out a mold releasing operation on the side surface on which molding has been finished by the action of said pistons 11a, 11b through oil pressure. Numerals 12 and 13 are pressure oil supply openings and pressure oil feeding pipes respectively to operate each piston 11a of the mold releasing cylinder 11 alternately. References 14 and 15 are cooling water supply openings and cooling pipes respectively to feed cooling water to the die plate 7. Reference numerals 16a and 16b, 16c are injection devices which are arranged on the base at the outside positions of said fixed boards 1a, 1b in such a manner that nozzles 17a and 17b, 17c of said injection devices are capable of advancing or retreating of or from injection openings 5c and 5d, 5e of said movable die plates 5c, 5b.

In the synthetic resin molding machine thus constructed according to the present invention, metallic molds 20, 22 and 21, 23 are respectively fixed to the front surfaces of the movable die plates 5a, 5b and to the mold fixing surfaces 7a, 7b of said die plate 7, which oppose said front surfaces. Firstly, the mold tightening cylinders 3a are moved forward to press the metallic mold 20 as well as the movable die plate 5a against the metallic mold 21 so as to perform a mold tightening, and the nozzle 17a of the injection molding device 16a is moved forward to mold one member through the injection opening 5c of said die plate 5a. After the molding of said one member, if the nozzle 17a of said injection device 16a and the movable die plate 5a are retreated to carry out a mold releasing, at the metallic mold 21 there may be left a mono-colored, half-finished article wherein one member only has been molded. On the other hand, the rack 9 for rotation which is provided in the upper board bearing 6a is operated to turn and revolve by 180° the central die plate 7 which is journaled turnably and revolvably between the bearing boards 6a, 6b with said shafts 8a, 8b. In succession, both the mold tightening cylinders 3a, 3b are advanced to press the metallic molds 20, 22 as well as the movable die plates 5a, 5b against the metallic molds 21, 23 (previously 23, 21) to carry out a mold tightening, and then the nozzles 17a and 17b, 17c of the injection devices 16a and 16b, 16c are respectively advanced. In such way, one member is molded with a pair of metallic molds 20, 21 (previously 23) through the injection opening 5c by one injection device 16a, and at the same time two members of different colors are additionally molded, through the injection openings 5d, 5e to the metallic mold 23 (previously 21) in which only one member has been molded in the previous step by the injection devices 16b, 16c and to the metall'c mold 22 which is mold tightened under pressure agai st said metallic mold 23. As a result, an article moldec in integrity with three colors is produced in the metallic molds 23 (previously 21), 22.

Accordingly, if both the nozzles 17a and 17b, 17c of said injection devices 16a and 16b, 16c and the movable die plates 5a, 5b are retreated to perform a mold releasing, it results in that a three-colored, molded article may be left in one metallic mold 21 and a single-colored, half-finished article in which only one member has been molded, in the other metallic mold 23. Therefore, if the article only of said metallic mold 21 is released by the mold releasing cylinder 11 and the same operation is successively repeated by rotating the central die plate 7 by 180° through the re-action of the rack 9 for rotation, it results in that an article molded in integrity having three colors is manufactured in succession.

The embodiment shown in the drawings explains only the case of a three-colored molded article. In case of molding a four-colored article, however, if two injection openings 5c are provided in one die plate 5a and also two injection devices 16a are arranged like said injection devices 16b, 16c, the four-colored article can be successively produced as in the case of three-colored molding. Thus, the present machine can be widely utilized for molding multicolored articles.

As is clear from the explanations in the above embodiment, according to the present invention it is possible to produce multicolored molded articles quickly and easily with good efficiency of mold tightening because the present machine is constructed in such a manner that injection is carried out by advancing the nozzles of the injection devices towards the same direction as that of mold tightening. Accordingly, it is recognized that the present machine brings about many advantages as a synthetic resin molding machine in the industries.

What is claimed is:

1. A molding machine for synthetic resin article, comprizing journals provided turnably and revolvably between upper and lower bearing boards, a central die plate whose both sides have been formed into mold fixing surfaces, die plates which move forward and backward by mold tightening cylinders, approachably to and releasably from each of said mold fixing surfaces of the central die plate, to be guided with rods mounted between the upper and lower positions of fixed boards provided on the base and said bearing boards, and a suitable number of injection devices respectively onto the base at the positions outside the fixed boards in such a manner that the nozzles of said injection devices are capable of advancing and retreating to and from respective injection openings of the movable die plate.

2. A moulding machine according to claim 1, characterized in that there are provided one injection device on one side of said central die plate and two injection devices on the other side.

3. A moulding machine according to claim 1, characterized in that there are two injection devices on both sides of said central die plate.

* * * * *